(12) United States Patent
Lux et al.

(10) Patent No.: US 10,417,817 B2
(45) Date of Patent: Sep. 17, 2019

(54) SUPERSAMPLING FOR SPATIALLY DISTRIBUTED AND DISJOINED LARGE-SCALE DATA

(71) Applicant: NVIDIA Corporation, Santa Clara, CA (US)

(72) Inventors: Henning Christopher Lux, Berlin (DE); Marc Nienhaus, Berlin (DE); Joerg Mensmann, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 252 days.

(21) Appl. No.: 14/929,139

(22) Filed: Oct. 30, 2015

(65) Prior Publication Data

US 2016/0140689 A1    May 19, 2016

Related U.S. Application Data

(60) Provisional application No. 62/079,516, filed on Nov. 13, 2014.

(51) Int. Cl.

| | |
|---|---|
| *G06T 17/10* | (2006.01) |
| *H04N 19/93* | (2014.01) |
| *H04N 19/136* | (2014.01) |
| *H04N 19/70* | (2014.01) |
| *G06T 1/20* | (2006.01) |
| *H04N 19/44* | (2014.01) |
| *G06T 15/50* | (2011.01) |
| *G06T 3/40* | (2006.01) |

(52) U.S. Cl.
CPC ............... *G06T 17/10* (2013.01); *G06T 1/20* (2013.01); *G06T 15/503* (2013.01); *H04N 19/136* (2014.11); *H04N 19/44* (2014.11); *H04N 19/70* (2014.11); *H04N 19/93* (2014.11); *G06T 3/40* (2013.01); *G06T 2210/52* (2013.01)

(58) Field of Classification Search
None
See application file for complete search history.

(56) References Cited

U.S. PATENT DOCUMENTS 5,875,304 A * 2/1999 Winter .............. G06F 17/30017
348/E5.099
6,639,597 B1 * 10/2003 Zwicker ................ G06T 15/405
345/421

(Continued)

*Primary Examiner* — YuJang Tswei
(74) *Attorney, Agent, or Firm* — Leydig, Voit & Mayer, Ltd.

(57) ABSTRACT

A method, computer readable medium, and system are disclosed for supersampling a large-scale and disjoined data set. The data set may include point cloud, voxel, or polygonal mesh data. The data set may be rendered using a distributed, sort-last rendering system that includes a plurality of rendering nodes and one or more compositing nodes. The method includes the steps of receiving graphics data at a plurality of rendering nodes, rendering at least a portion of the graphics data by one or more rendering nodes to produce multi-sample image data, encoding the multi-sample image data using a difference encoding technique, and transmitting the encoded multi-sample image data to a compositing node. The multi-sample image data comprises a plurality of values per pixel of a target image corresponding to a plurality of sample locations defined for each pixel of the target image.

18 Claims, 14 Drawing Sheets

(56) References Cited

U.S. PATENT DOCUMENTS

| | | | |
|---|---|---|---|
| 9,712,817 B1* | 7/2017 | Cismas | H04N 19/0009 |
| 2009/0091577 A1* | 4/2009 | Brothers | G06T 1/20 |
| | | | 345/506 |
| 2011/0148901 A1* | 6/2011 | Adams | G06T 11/40 |
| | | | 345/589 |
| 2013/0293565 A1* | 11/2013 | Arvo | G06T 9/00 |
| | | | 345/589 |
| 2014/0297799 A1* | 10/2014 | Gordon | H04L 67/38 |
| | | | 709/217 |
| 2015/0062154 A1* | 3/2015 | Ellis | G06T 11/40 |
| | | | 345/619 |

* cited by examiner

1010

1020

SUPERSAMPLING FOR SPATIALLY DISTRIBUTED AND DISJOINED LARGE-SCALE DATA

CLAIM OF PRIORITY

This application claims the benefit of U.S. Provisional Application No. 62/079,516 titled "Supersampling for Spatially Distributed and Disjoined Large Scale Data," filed Nov. 13, 2014, the entire contents of which is incorporated herein by reference.

FIELD OF THE INVENTION

The present invention relates to rendering, and more particularly to super sample anti-aliasing algorithms in sort-last parallel rendering systems.

BACKGROUND

Rendering large-scale data sets, such as point cloud data or volumetric data, is a computationally intensive task. Conventionally, the rendering task may be implemented by a sort-last parallel rendering system including a plurality of nodes, where the rendering task is shared among the nodes. The sort-last parallel rendering system is divided into three phases: (1) a partitioning phase; (2) a rendering phase; and (3) a compositing phase. In the partitioning phase, the entire volume of graphics data is subdivided into different sub-volumes. In the rendering phase, each of a plurality of nodes is assigned one of the sub-volumes to render distinct sub-images. In the compositing phase, a compositing node combines the sub-images into a target image for display.

The target image has a particular resolution, typically sized according to the resolution of the display device that will display the image. Scenes that are sampled at the discrete sampling frequency associated with the resolution may include aliasing artifacts caused by high frequency signals in the scene sampled at the lower sampling frequency. For example, Moire patterns are one type of image artifact that can appear due to this type of sampling. One technique for reducing these artifacts is to implement some type of anti-aliasing.

In a simple implementation to reduce aliasing artifacts, areas of the target image associated with large color gradients (i.e., edges) may be blurred to reduce the effect of the aliasing artifacts. This may be performed after the target image has been composited, but is the least effective method for correcting aliasing as it simply blurs the artifacts in the target image. Another implementation to reduce aliasing artifacts is to perform multi sample anti-aliasing (MSAA). In MSAA, during rendering, a color value for a pixel may be calculated based on multiple samples. However, such samples are typically filtered immediately during an intermediate step in the graphics processing pipeline to produce one color value for the pixel for a given primitive. These color values are stored in a frame buffer at a resolution that matches the resolution of the target image. In other words, taking multiple samples when computing a color value at an intermediate step of the graphics processing pipeline has the effect of sampling the scene at a higher frequency, thereby reducing the aliasing artifacts. However, each sample is not fully rendered independently of all the other samples for the pixel. For example, a single depth value may be calculated for the primitive even though multiple texture samples are filtered to generate the single color value. Yet another implementation to reduce aliasing artifacts is super sample anti-aliasing (SSAA). In SSAA an image is fully rendered at a higher resolution and then the image is filtered to produce the target image for display at the lower resolution. In effect, each pixel in the target image is rendered as if multiple samples for the pixel are individual pixels of the higher resolution image.

SSAA requires more processing capacity and memory/network bandwidth than MSAA, but SSAA typically produces the best results. However, some hardware architectures may not have the available processing capacity or bandwidth to fully implement SSAA without some compromise, such as by reducing frame rates. Thus, there is a need for addressing these issues and/or other issues associated with the prior art.

SUMMARY

A method, computer readable medium, and system are disclosed for supersampling a large-scale and disjoined data set. The data set may include point cloud, voxel, or polygonal mesh data. The data set may be rendered using a distributed, sort-last rendering system that includes a plurality of rendering nodes and one or more compositing nodes. The method includes the steps of receiving graphics data at a plurality of rendering nodes, rendering at least a portion of the graphics data by one or more rendering nodes to produce multi-sample image data, encoding the multi-sample image data using a difference encoding technique, and transmitting the encoded multi-sample image data to a compositing node. The multi-sample image data comprises a plurality of values per pixel of a target image corresponding to a plurality of sample locations defined for each pixel of the target image.

DETAILED DESCRIPTION

A sort-last rendering system is described herein that implements SSAA while reducing the bandwidth of data transferred between nodes. The sort-last rendering system includes a plurality of rendering nodes as well as one or more compositing nodes. Each of the rendering nodes may render a portion of the scene encoded by a large-scale data set. The large-scale data set may represent a polygonal mesh, a point cloud, volumetric data, or any other type of data structure that represents geometry primitives for 3D rendering.

Each rendering node may include a processor that implements a graphics processing pipeline for converting the 3D primitive data into a 2D sub-image. The graphics processing pipeline may implement some form of SSAA that generates multiple color values for each pixel of a target image. Each compositing node may include a processor that receives the 2D sub-images generated by the rendering nodes and combines the multiple color values per pixel into a single color value for the pixel of the target image. If multiple compositing nodes are included in the system, then each compositing node may generate pixel values for a portion of the target image (e.g., a block of contiguous pixels, a slice of the image, etc.).

Figure 1:
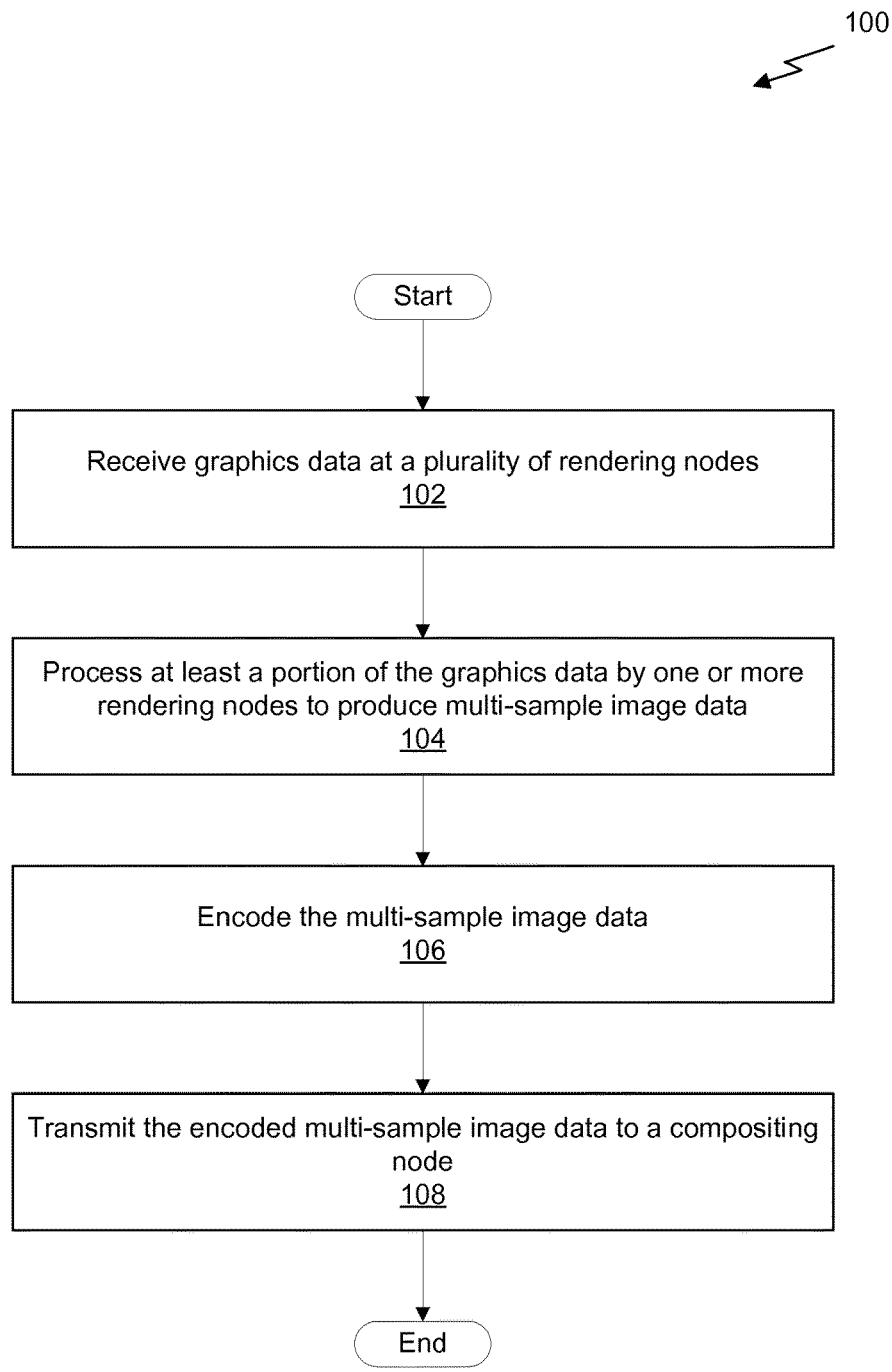
FIG. 1 illustrates a flowchart of a method for implementing a distributed rendering task with SSAA, in accordance with one embodiment.

FIG. 1 illustrates a flowchart of a method for implementing a distributed rendering task with SSAA, in accordance with one embodiment. At step 102, a plurality of rendering nodes receives graphics data. In one embodiment, the graphics data is a polygonal mesh, where each primitive of the mesh may include primitive attributes as well as a plurality of vertices, each vertex having one or more vertex attributes (e.g., color, texture coordinates, normal vector, etc.). In another embodiment, the graphics data is point cloud data, where each point in the point cloud is associated with a vector that identifies the location of the point in a model space. The point may also be associated with one or more attributes, such as a color, density, transparency, and the like. In yet another embodiment, the graphics data is volumetric data such as a plurality of voxels. Each voxel may represent a discrete portion of 3D space and be associated with one or more attributes.

At step 104, one or more rendering nodes process at least a portion of the graphics data to produce multi-sample image data. In one embodiment, a single rendering node renders at least a portion of the graphics data to generate multi-sample image data stored in a multi-sample frame buffer. In one embodiment, the multi-sample frame buffer is a 2D array storing values for pixels of a target image. The resolution of the multi-sample frame buffer may be higher than a resolution of the target image such that each element of the 2D array stores one or more values for a particular sub-sample of a pixel, with a plurality of elements in the 2D array corresponding to a single pixel. Each element may store a color value and/or depth value for a particular sample location of a corresponding pixel. In another embodiment, the multi-sample frame buffer includes a plurality of frame buffer tiles, where each frame buffer tile is a 2D array of values for pixels of the target image. Each frame buffer tile may have a resolution equal to a resolution of the target image such that each element of the 2D array stores one or more values for a particular pixel. Each frame buffer tile corresponds to a sample index that is associated with a different sample location in each pixel. Thus, the multi-sample frame buffer comprises a plurality of frame buffer tiles, each frame buffer tile corresponding to a different sample index of the multi-sample image data.

In one embodiment, the multi-sample image data may be stored in a plurality of frame buffer tiles. Each frame buffer tile may include a color buffer and a depth buffer for a particular sample index of the multi-sample image data. In some embodiments, the frame buffer tiles may only include the color buffer. In one embodiment, each frame buffer tile may correspond to only a portion of the target image. For example, the target image may be subdivided into different portions and then different sets of one or more rendering nodes are configured to render a portion of the target image. In such cases, the frame buffer tiles may have a resolution that is less than a resolution of the target image because the frame buffer tiles only include image data for a portion of the target image.

In one embodiment, at least two rendering nodes are configured to process the portion of the graphics data. The multi-sample frame buffer may be generated by the at least two rendering nodes, where different frame buffer tiles of the multi-sample frame buffer are generated and stored in memories of the two or more rendering nodes. Thus, the multi-sample frame buffer may be distributed across different rendering nodes.

In one embodiment, each rendering node includes a parallel processing unit that implements, at least in part, a graphics processing pipeline for rendering the portion of the graphics data. Techniques for rendering polygonal meshes, point cloud data, or voxels are well-known in the art. The graphics processing pipeline is configured to implement SSAA such that the multi-sample image data includes multiple color values, transparency values, depth values, and the like corresponding to different sample locations for each pixel of the target image.

In one embodiment, the graphics processing pipeline defines N sample locations per pixel. For each graphics primitive being rendered, N color values are produced for each pixel that intersects the primitive in screen space. The N color values correspond to the N sample locations. In some embodiments, each color value may also be associated with a transparency value and/or a depth value. The values associated with a given sample location may be written to the multi-sample frame buffer. In one embodiment, each color value of the N color values is written to a different frame buffer tile in the multi-sample frame buffer.

In one embodiment, a single rendering node generates N frame buffer tiles in a memory. The resolution of each frame buffer tile is equal to a resolution of at least a portion of the target image. Each frame buffer tile in the N frame buffer tiles is associated with a different sample index in a plurality of sample indices, where each sample index in the plurality of sample indices corresponds to a particular sample location of the N sample locations. In other words, each frame buffer tile in the N frame buffer tiles stores a value or values (e.g., a color value and a depth value) per pixel for a single sample location.

For example, the SSAA algorithm may generate values for 16 sample locations per pixel, with each sample location in a pixel being associated with a 32-bit color value (e.g., RGBA with eight bits per component) as well as a 32-bit depth value after the primitives that intersect the pixel are rendered. The values for a pixel corresponding to a particular sample location of the 16 sample locations may be stored in a corresponding frame buffer tile associated with a sample index corresponding to the particular sample location. Sample indexes may range from, e.g., 0 through 15 when there are 16 samples per pixel.

In another embodiment, two or more rendering nodes generate the N frame buffer tiles in memories associated with each of the two or more rendering nodes. Each rendering node in the two or more rendering nodes may generate a subset of the N frame buffer tiles associated with a subset of sample indices in the plurality of sample indices. In one embodiment, N rendering nodes generate N frame buffer tiles, where each rendering node generates one of the N frame buffer tiles corresponding to a particular sample index.

At step 106, the one or more rendering nodes encode the multi-sample image data. In one embodiment, a reference frame buffer tile of the multi-sample image data is identified. The reference frame buffer tile may be a first frame buffer tile that corresponds to sample index 0. The reference frame buffer tile is utilized to encode the other frame buffer tiles (e.g., all other frame buffer tiles of the multi-sample image data associated with sample indices greater than zero (i.e., 1, 2, . . . , N−1)) using a difference encoding technique. For each pixel in the frame buffer tile being encoded, a difference value is calculated by subtracting a corresponding value for the pixel in the reference frame buffer tile from the value for the pixel in the frame buffer tile. Then, the plurality of difference values corresponding to a plurality of pixels associated with the frame buffer tile are encoded using run length encoding. Encoding via the difference technique may be performed for each component of a pixel separately (e.g., color components, depth component, etc.).

The reference frame buffer tile may also be encoded along with the other frame buffer tiles. In one embodiment, the reference frame buffer tile is encoded without compression. When no compression is used, the reference frame buffer tile is encoded with each value being encoded at the full bit depth of the value. The encoded values for the pixels may be read out in row major or column major order. In another embodiment, the reference frame buffer tile is encoded with compression. When compression is used, the reference frame buffer tile may be encoded using an intra-frame compression technique (i.e., the frame may be encoded using only the information within that frame). For example, the rendering node may divide the first frame buffer into blocks, calculate an average color value for each block, and then encode the block based on a difference between the value for a pixel and the average color value for the block. The block may be compressed by run length encoding the difference values.

At step 108, the encoded multi-sample image data is transmitted to a compositing node. The encoded multi-sample image data may include both the encoded reference frame buffer tile and the encoded additional frame buffer tiles. The compositing node may then decode each of the N frame buffer tiles to reconstruct a multi-sample frame buffer that includes multiple values per pixel corresponding to each of the N sample locations. The multi-sample frame buffer may then be filtered to produce a target image. In one embodiment, the compositing node may be one of a plurality of compositing nodes that generate different portions (i.e., sub-images) of the target image with a master node configured to combine the different sub-images generated by each compositing node into the target image.

In another embodiment, the compression of the frame buffer tiles may utilize existing video compression hardware included in each of the nodes. For example, a hardware video engine included in a processor may implement standard H.264 or MPEG 4 Part 10, AVC video codecs, which use intra-frame and inter-frame compression to encode a sequence of frames of video. The N frame buffer tiles may be transmitted to the hardware video engine as a plurality of frames representing a sequence of video even though each of the N frame buffer tiles store values associated with a single frame of multi-sample image data. The hardware video engine may compress the frames using existing video codecs such that the frames can be transmitted to the compositing node. For example, the H.264 codec may be configured to encode video using a group of pictures (GOP) with parameters M=4 and N=16 that results in the following frame structure: IBBBPBBBPBBBPBBB, where I stands for an intra-encoded frame, P stands for a predictive frame, and B stands for a bi-directional predictive frame. Alternatively, the parameter M=1 may be utilized such that the N−1 additional frame buffer tiles are encoded as P-frames and the reference frame buffer tile is encoded as an I-frame. The compositing node may also be configured to decode the received video stream using a hardware video engine to regenerate the original N frame buffer tiles to reconstruct the multi-sample frame buffer. Instead of displaying the N frame buffer tiles as video, the compositing node may use the decoded frames to populate the multi-sample frame buffer, which is then filtered to generate the target image. It will be appreciated that the video codecs described herein are a lossy compression technique and, therefore, the decoded image data may not be exactly the same as the rendered image data prior to encoding. Nevertheless, the use of existing hardware may outweigh the loss in accuracy due to quantization resulting from these compression techniques.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
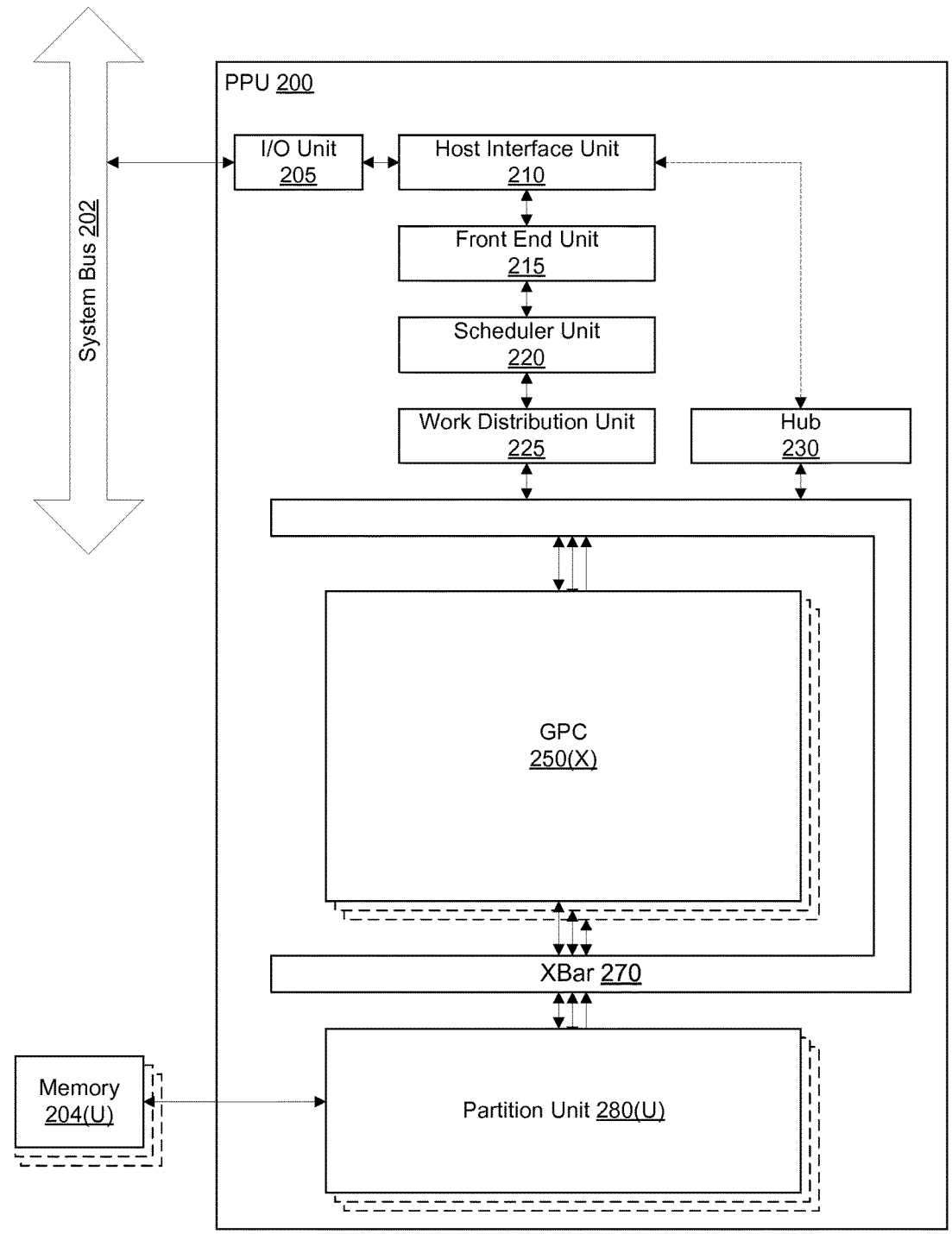
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
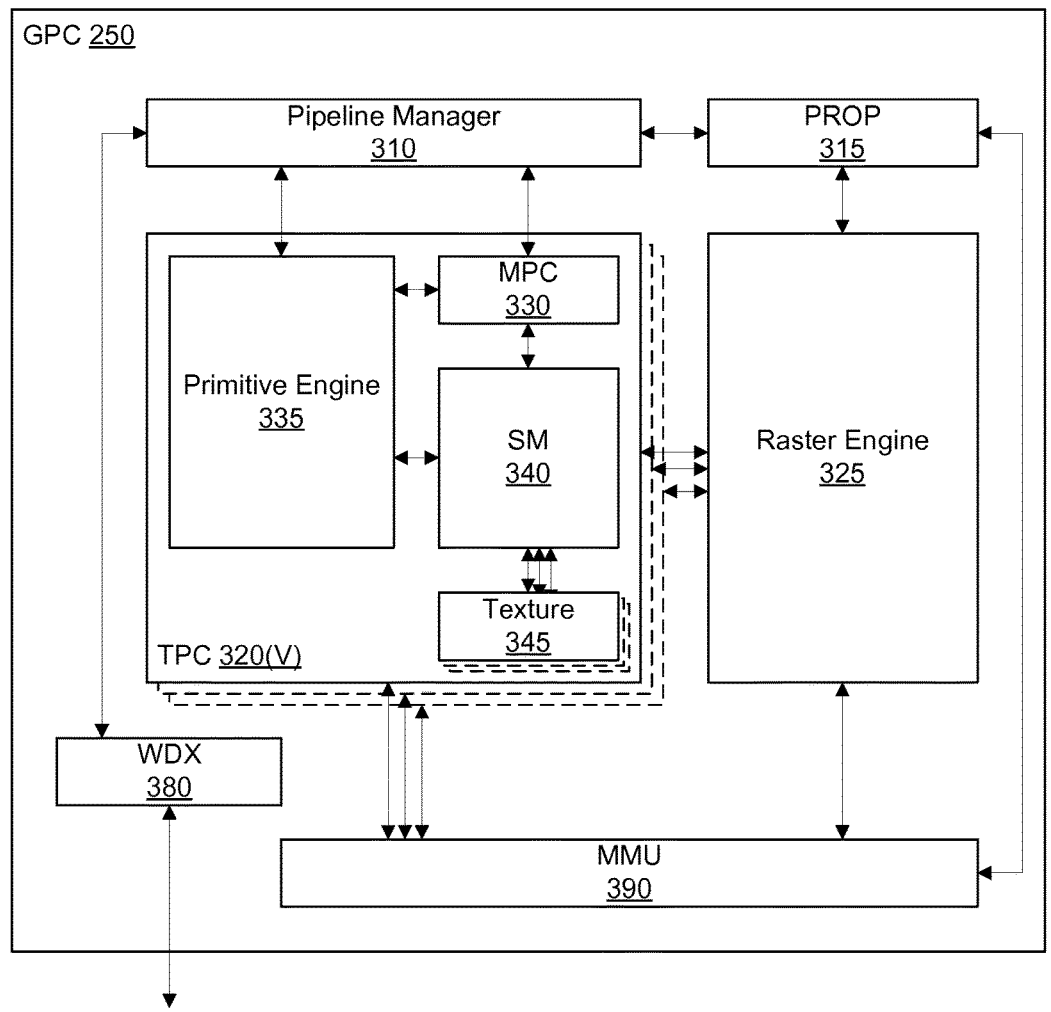
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
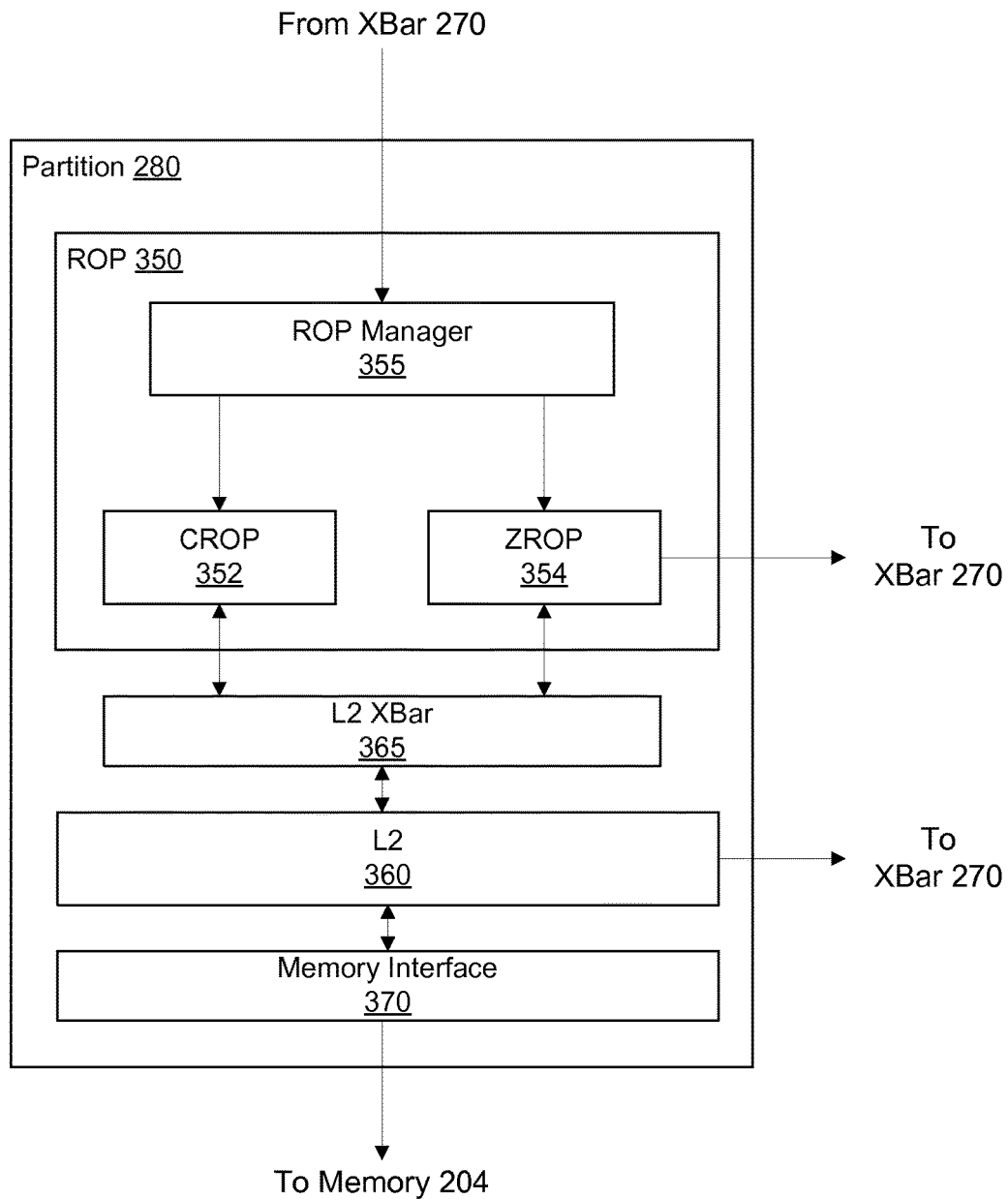
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
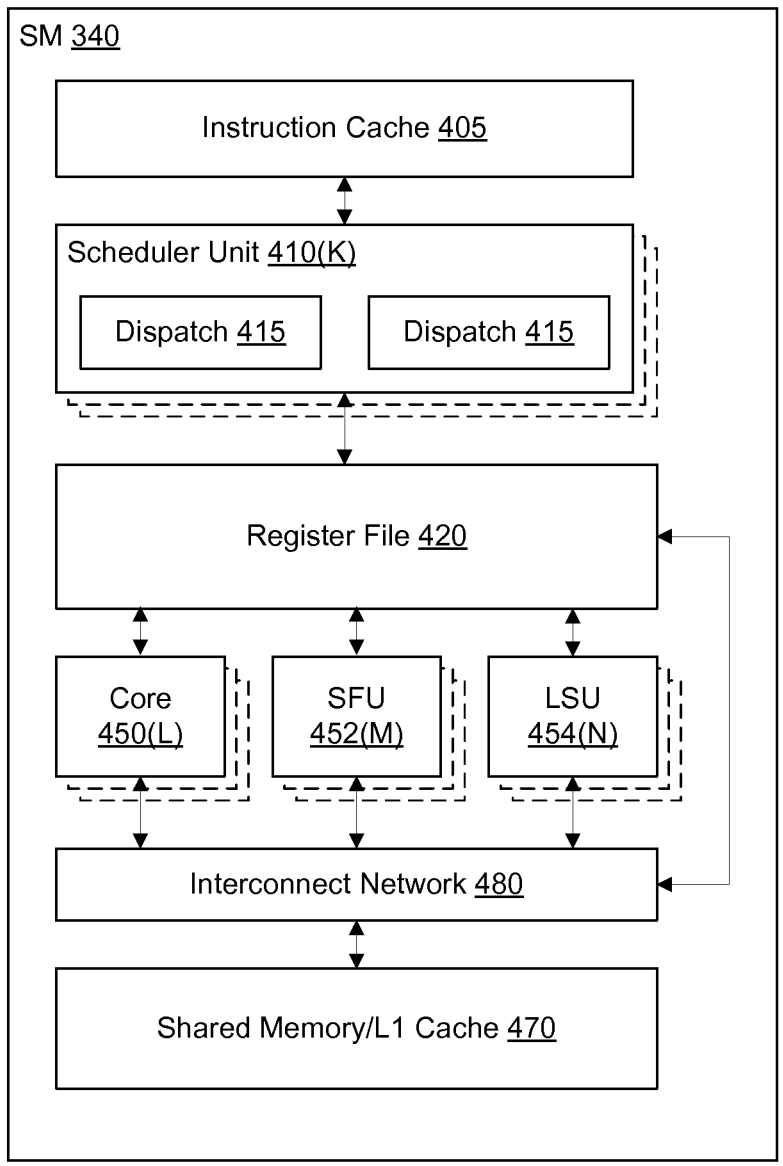
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
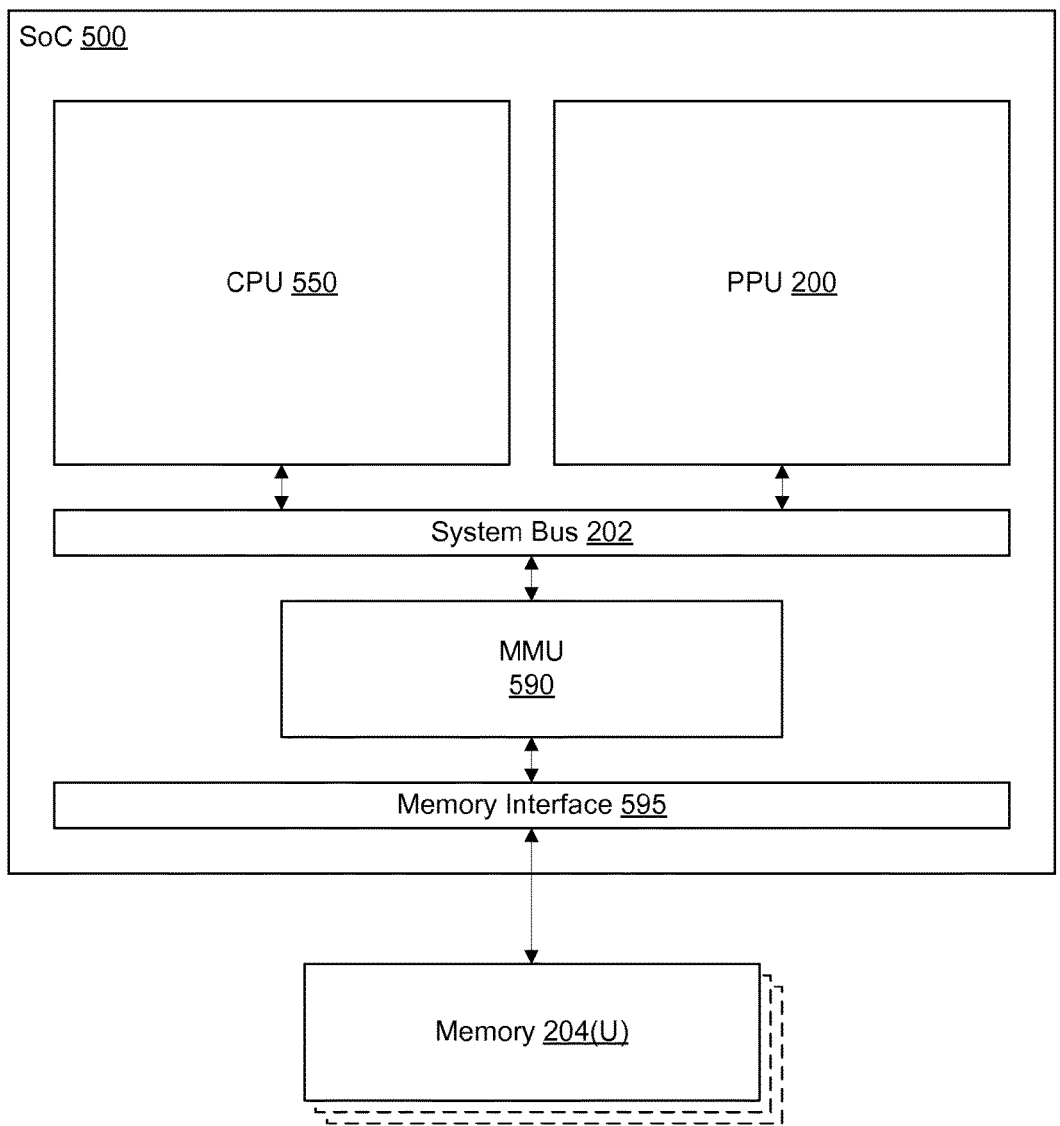
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
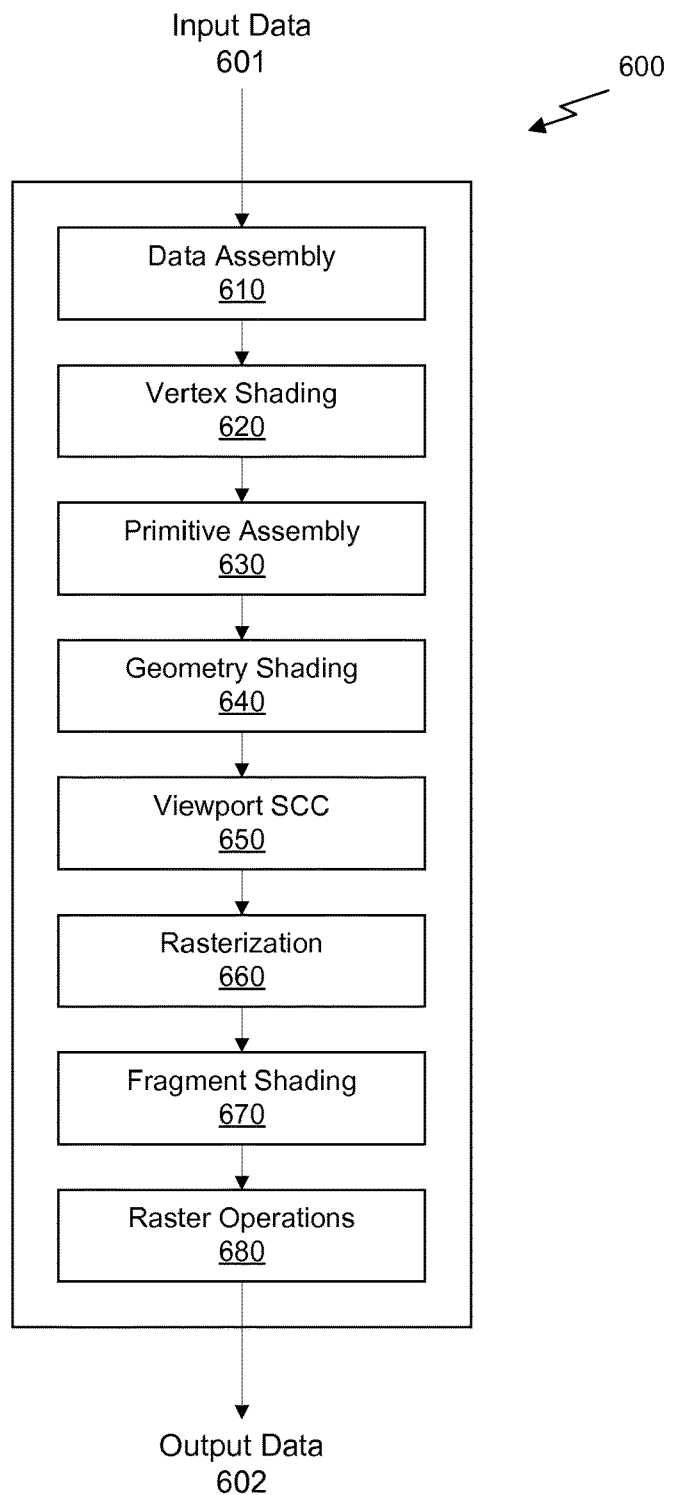
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Sort-Last Rendering System

Figure 7:
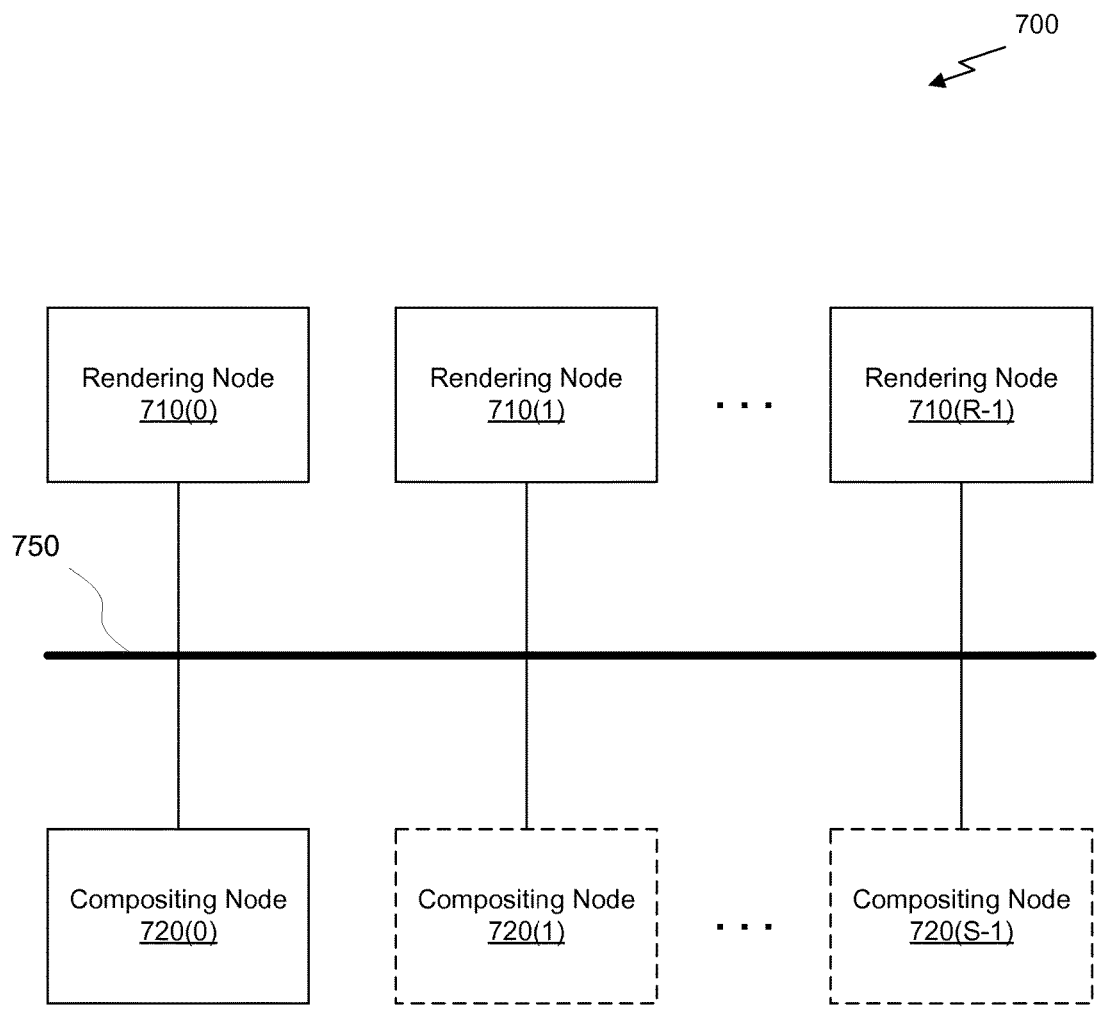
FIG. 7 illustrates a sort-last rendering system, in accordance with one embodiment.

FIG. 7 illustrates a sort-last rendering system 700, in accordance with one embodiment. As shown in FIG. 7, the system 700 includes a plurality of nodes comprising a plurality of rendering nodes 710 and one or more compositing nodes 720. In one embodiment, each node comprises a processor, such as PPU 200 or SoC 500, as well as memory (e.g., SDRAM, HDD, SSD, etc.). One or more nodes may be included in a computer or a server coupled to a network. Multiple computers or servers may communicate over a network to enable a plurality of nodes to operate in parallel. In another embodiment, each node may be implemented as a server blade, with server blades distributed in one or more racks in one or more data centers. In yet another embodiment, each node may refer to a virtual machine (VM) that emulates, via software, a particular set of hardware resources, such as the PPU 200 or SoC 500 as well as memory. Each VM may be executed on hardware accessible via a network. For example, Amazon Web Services (AWS®) provides virtual servers that may be utilized to process various applications using hardware hosted in Amazon® data centers. A virtual machine may be launched using such services provided over a network to dynamically generate the nodes of the system 700.

Each of the nodes may be connected to a network 750 that enables data to be transmitted between the nodes. The network 750 may be a LAN, WAN, the Internet, or the like. In one embodiment, data may be transmitted between nodes utilizing IP packets. The network 750 may be a wired network or a wireless network. For example, network 750 may adhere to the IEEE 802.3 Ethernet specification or the IEEE 802.11 Wireless LAN specification. In alternate embodiments, the network 750 may be a dedicated high-speed interface such as a PCIe interface that enables data to be transmitted between nodes across a bus.

In one embodiment, the system 700 includes a plurality of rendering nodes 710 coupled to a single compositing node 720. The compositing node 720 may be configured to distribute a portion of the rendering task to each of the rendering nodes 710. The compositing node 720 receives the encoded multi-sample image data from each of the rendering nodes 710 that is decoded to reconstruct a multi-sample frame buffer in a memory of the compositing node 720, which may be filtered to generate a target image.

In another embodiment, the system 700 includes a plurality of rendering nodes 710 coupled to two or more compositing nodes 720. It will be appreciated that the number of rendering nodes 710 does not need to equal the number of compositing nodes 720. In such embodiments, one compositing node 720 may be configured as the master node while the other compositing nodes 720 are configured as slave nodes. The master node may distribute a portion of the rendering task to each of the rendering nodes 710 and designate which compositing nodes 720 are configured to receive the encoded multi-sample image data from each of the rendering nodes 710. The two or more compositing nodes 720 may reconstruct different portions of the multi-sample frame buffer, which are filtered to generate a plurality of sub-images, which are then transmitted to the master compositing node 720 to be combined into the target image.

It will be appreciated that, in other embodiments, a separate and distinct master node may be configured to handle scheduling the rendering tasks at each of the plurality of rendering nodes as well as the one or more compositing nodes. Thus, the master node may not be configured to assist in compositing the target image. In yet other embodiments, each of the nodes may communicate with the other nodes in order to distribute the rendering task among the nodes. In such embodiments, no master node is required as each node includes logic for dividing and distributing the rendering task. Such logic may include broadcasting availability information to each of the other nodes, or asynchronously popping portions of the rendering task off a queue that includes the portions of the rendering task.

Figure 8A:
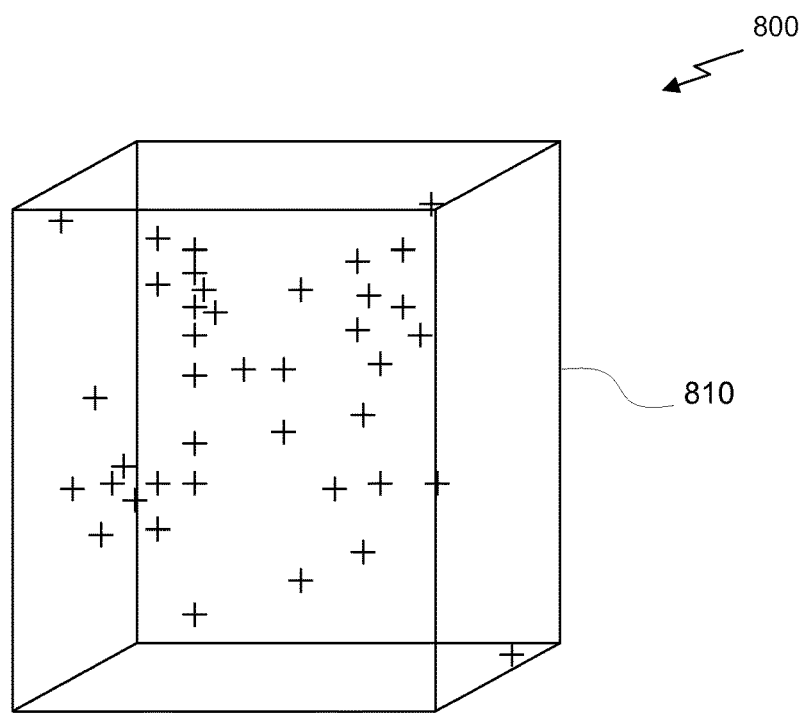
FIGS. 8A and 8B illustrate graphics data for a scene, in accordance with one embodiment.
Figure 8B:
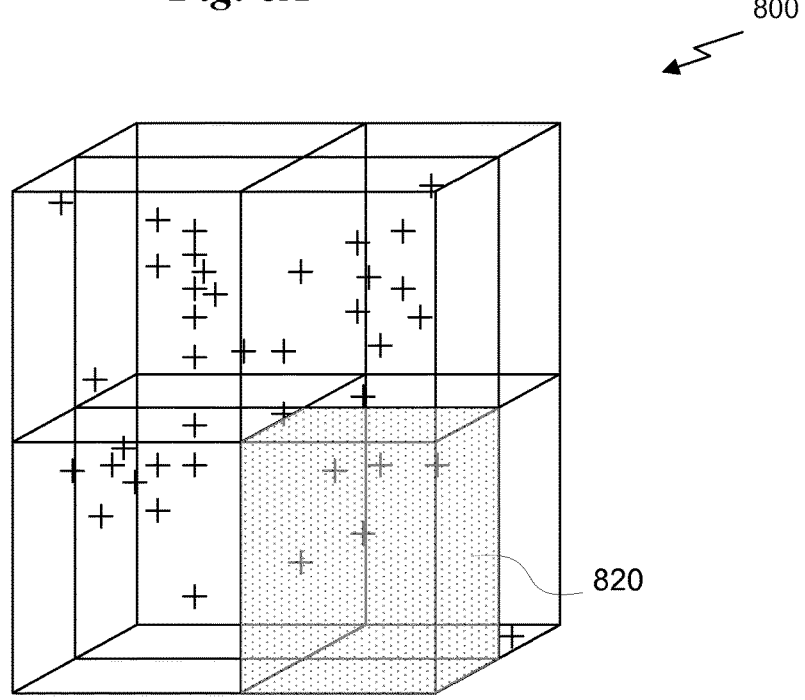

FIGS. 8A and 8B illustrate graphics data 800 for a scene, in accordance with one embodiment. As shown in FIG. 8A, the graphics data 800 may comprise a point cloud. The point cloud may be entirely enclosed within a bounding volume 810. In alternative embodiments, the graphics data 800 may be a polygon mesh, voxels, or some other set of geometric primitives. In each instance, however, the geometric primitives represented by the graphics data 800 may be enclosed by the bounding volume 810.

In the first phase of a sort-last rendering algorithm, the graphics data 800 may be divided into a plurality of different portions, with one or more rendering nodes of the plurality of rendering nodes 710 allocated a different portion of the graphics data 800 for rendering. For example, one rendering node may be assigned each portion of the graphics data 800 for rendering. In another example, two or more rendering nodes may be assigned each portion of the graphics data 800 for rendering, with each rendering node in the two or more rendering nodes processing a subset of sample locations per pixel of the target image. In yet another example, N rendering nodes corresponding to N sample locations may be assigned each portion of the graphics data 800 for rendering, with each rendering node of the N rendering nodes processing a single sample location per pixel of the target image.

In one embodiment, the bounding volume 810 may be dissected into a plurality of sub-volumes 820, each sub-volume 820 enclosing a portion of the graphics data 800 for the scene. The different sub-volumes 820 may be assigned to the rendering nodes 710 to generate multi-sample image data for the target image corresponding to that portion of the graphics data 800. As shown in FIG. 8B, the bounding volume 810 has been divided into eight sub-volumes by bisecting the bounding volume with three planes. The number of divisions may be based on the number of rendering nodes available for processing the graphics data 800. Each sub-volume 820 may then be assigned to a different subset of the rendering nodes 710, where the subset is as small as a single rendering node 710. In other words, each point in the point cloud may be transmitted to a different subset of rendering nodes 710 based on the identifier (ID) of the sub-volume 820 that encloses that particular point. Thus, the graphics data 800 may be divided into different portions that will be rendered separately on different rendering nodes 710 based on the division of the bounding volume 810.

It will be appreciated that the different sub-volumes 820 do not need to be uniform in size or shape. For example, with point cloud data, a centroid of the point cloud may be determined by calculating a mean value for all the points in the point cloud, and the three planes that bisect the bounding volume 810 may pass through the centroid of the point cloud 800. This type of bisection of the bounding volume 810 may be more efficient from a processing standpoint because the points in the point cloud may not be uniformly distributed around a centroid of the bounding volume 810.

In one embodiment, each sub-volume 820 may be distributed to multiple rendering nodes such that a subset of the rendering nodes 710 render the same portion of the graphics data for different sample locations. For example, a first rendering node 710(0) may render a first portion of the graphics data 800 for a first sample index (0), a second rendering node 710(1) may render the first portion of the graphics data 800 for a second sample index (1), a third rendering node 710(2) may render the first portion of the graphics data 800 for a third sample index (2), and so forth. Thus, each rendering node may generate a different frame buffer tile of the N frame buffer tiles for the first portion of the graphics data 800. Other subsets of rendering nodes 710 may generate multi-sample image data for the other portions of the graphics data 800. Alternatively, each rendering node in the subset of the rendering nodes 710 may render the portion of the graphics data 800 for two or more sample indices, but not all sample indices; e.g., a first rendering node 710(0) renders the first portion of the graphics data 800 for sample indices 0-3, a second rendering node 710(1) renders the first portion of the graphics data 800 for sample indices 4-7, and so forth. In such embodiments, the reference frame buffer tile may be transmitted from one of the rendering nodes 710 to the other rendering nodes 710 such that the other rendering nodes 710 can encode the additional frame buffer tiles based on the reference frame buffer tile. In some implementations of the system 700, it may be possible that some rendering nodes 710 can access a shared memory such that the reference frame buffer tile may be read from the shared memory by the additional rendering nodes 710. For example, a SoC may include four or eight graphics cores that share a local memory, where each of the graphics cores comprises a rendering node 710. Thus, different graphics cores may be configured to generate different frame buffer tiles for different subsets of sample indices in the shared memory, but all graphics cores have access to the N frame buffer tiles in the shared memory.

Figure 9:
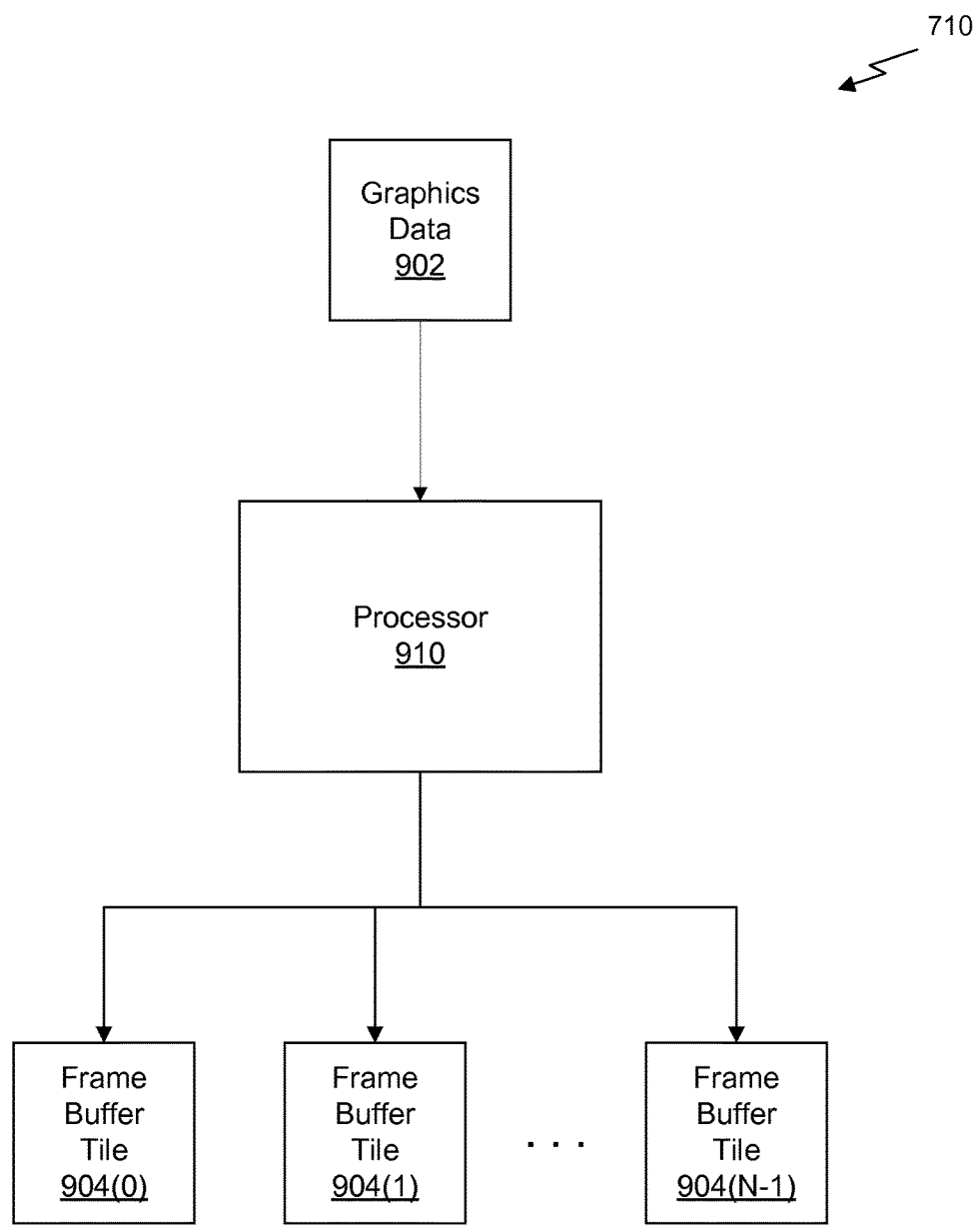
FIG. 9 illustrates a rendering task performed by a rendering node, in accordance with one embodiment.

FIG. 9 illustrates a rendering task performed by a rendering node 710, in accordance with one embodiment. As shown in FIG. 9, the rendering node 710 receives graphics data 902 for a portion of the rendering task assigned to the rendering node 710. The graphics data 902 may correspond to a portion of the graphics data 800 that intersects a sub-volume 820 assigned to the rendering node 710. A processor 910, such as PPU 200 or SoC 500, processes the graphics data 902 to generate multi-sample image data. The multi-sample image data is then stored in a plurality of frame buffer tiles 904.

In one embodiment, the processor 910 implements the graphics processing pipeline 600 for rendering the graphics data 902. If the graphics data 902 is a polygonal mesh, then the processor 910 may be configured to process each polygon of the polygonal mesh via the graphics processing pipeline 600. In one embodiment, for each pixel in screen space covered by a graphics primitive (e.g., triangle) of the polygonal mesh, the processor 910 generates color values corresponding to each of a plurality of sample locations for the pixel. In one embodiment, a plurality of threads are configured to process the primitive in parallel, with each thread corresponding to a different sample location of a pixel. The processor 910 may be configured to allocate a plurality of threads for processing a pixel covered by the graphics primitive, with one thread allocated per sample location for the pixel. Each thread will produce a color value for the pixel corresponding to the sample location associated with the thread. Each thread may also produce a depth value for the graphics primitive at the sample location. Thus, N threads may produce N color values in parallel, which may be stored in the N frame buffer tiles 904. Depth and/or transparency values for each sample location may also be stored in the N frame buffer tiles 904. Each color value, depth value, and/or transparency value is stored in a particular frame buffer tile 904 corresponding to the sample index associated with the thread that generated the value. Each primitive being processed may generate values for one or more pixels depending on how many pixels in screen space intersect (i.e., are covered by) the primitive.

It will be appreciated that, in different embodiments, the rendering node 710 may process all N sample locations for each covered pixel, a subset of sample locations in the N sample locations for each covered pixel, or one sample location in the N sample locations for each covered pixel. Again, the number of frame buffer tiles 904 generated by the rendering node 710 corresponds to the number of sample locations processed by the rendering node. When the rendering node 710 does not process all N sample locations for a pixel, then other rendering nodes 710 are configured to process the other sample locations.

In embodiments where the graphics data 902 comprises a point cloud or a plurality of voxels, the graphics data 902 may be processed by extracting a polygonal mesh from the graphics data 902 prior to processing the mesh, as described above. Alternatively, direct volume rendering may be implemented to process the point cloud or voxel data as long as such algorithms result in different values for each of multiple sample locations per pixel.

Once the graphics data 902 has been rendered to generate the frame buffer tiles 904, the frame buffer tiles 904 may be encoded for transmission to a compositing node 720. In one embodiment, the processor 910 may be configured to encode each of the frame buffer tiles 904 to generate encoded frame buffers. Again, a reference frame buffer tile, such as the first frame buffer tile 904(0), may be encoded without compression. In other words, the reference frame buffer tile may be transmitted to the compositing node 720 by transmitting each of the values in the reference frame buffer tile to the compositing node 720 at a full bit depth of the value. Each of the other frame buffer tiles, such as frame buffer tiles 904(1) through 904(N−1), may then be encoded using a difference encoding technique. In one embodiment, the processor 910 may encode a frame buffer tile by calculating difference values for the frame buffer tile by subtracting a value associated with each pixel in the reference frame buffer tile from a corresponding value associated with each pixel in the frame buffer tile being encoded. For example, a color difference value for a pixel in the second frame buffer tile 904(1) may be calculated by subtracting a color value for the pixel in the first frame buffer tile 904(0) from a color value for the pixel in the second frame buffer tile 904(1). In one embodiment, difference values may be calculated per color component for the pixel. In addition, a depth difference value and/or a transparency difference value for the pixel may be calculated in a similar manner. Once difference values for all of the pixels have been calculated, the second frame buffer tile 904(1) may be encoded by run length encoding the difference values for pixels in the second frame buffer tile 904(1) in a row major or column major order.

It will be appreciated that the processor 910 may encode each of the additional frame buffer tiles in a parallel fashion once all of the frame buffer tiles 904 have been generated. Alternatively, the processor 910 may render the graphics data 902 for each sample index in sequence such that each frame buffer tile 904 is generated in a serial fashion. As each frame buffer tile 904 is generated, the frame buffer tile 904 may be encoded and transmitted to the compositing node 720, thereby reducing the amount of memory required in the rendering node 710 (i.e., the memory only needs to store the reference frame buffer tile and the current frame buffer tile being encoded).

Figure 10A:
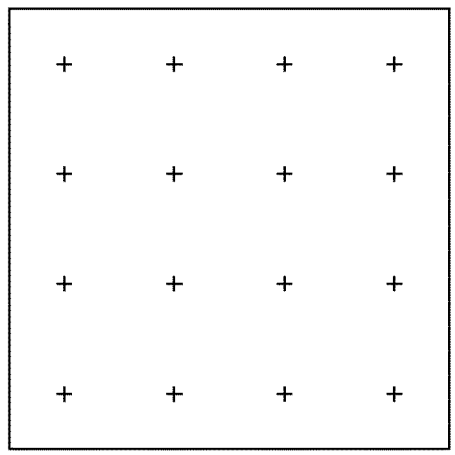
FIGS. 10A and 10B illustrate multiple sample locations associated with a pixel, in accordance with one embodiment.
Figure 10B:
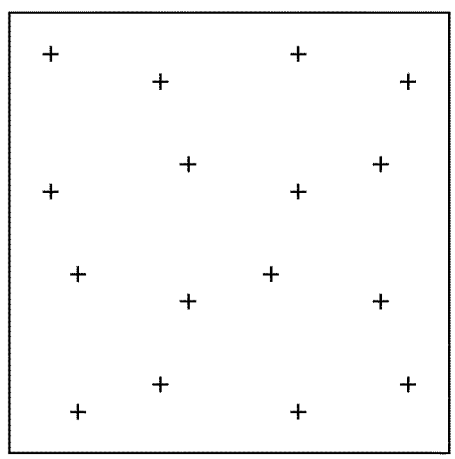

FIGS. 10A and 10B illustrate multiple sample locations associated with a pixel, in accordance with one embodiment. As shown in FIG. 10A, a pixel 1010 has 16 sample locations associated therewith. Each sample location is shown as a crosshair inside the boundary for the pixel 1010. The sample locations are arranged in a regular grid evenly spaced throughout the sample. During rendering, a color value is generated for each sample location covered by a primitive. A transparency value and/or depth value may also be generated for each sample location covered by the primitive. For each pixel rendered by the rendering node 710, values associated with a first sample location will be stored in a first frame buffer tile 904(0), values associated with a second sample location will be stored in a second frame buffer tile 904(1), values associated with a third sample location will be stored in a third frame buffer tile 904(2), and so forth. The sample locations are the same for each pixel of the target image.

In another embodiment, the sample locations may be jittered. As shown in FIG. 10B, the pixel 1020 has 16 sample locations associated therewith. Unlike the sample locations shown in FIG. 10A, the sample locations shown in FIG. 10B are not arranged on a regular grid. Instead, the sample locations are offset from the regular grid in a pattern. Jittering the sample locations may reduce image artifacts due to aliasing. Alternatively, the sample locations may be randomly distributed throughout the pixel. For example, each of the plurality of sample locations may be randomly generated by generating two random values between 0 and 1 that specify a coordinate of the sample location relative to the pixel. In yet another embodiment, the sample locations may be pseudo-random. For example, each of the sample locations of pixel 1010 may be slightly offset from the sample locations shown in FIG. 10A based on two random numbers. The adjustment may be limited, e.g., to moving the sample locations up to ⅛ of the pixel width or height in both the horizontal or vertical directions. Thus, each sample location is pseudo-randomly distributed within $\frac{1}{16}^{th}$ of the pixel, with exactly one sample location included in every $\frac{1}{16}^{th}$ portion of the pixel. The sample locations are the same for each pixel of the target image (i.e., the sample locations may be stored as locations relative to a base location of each pixel).

Figure 11:
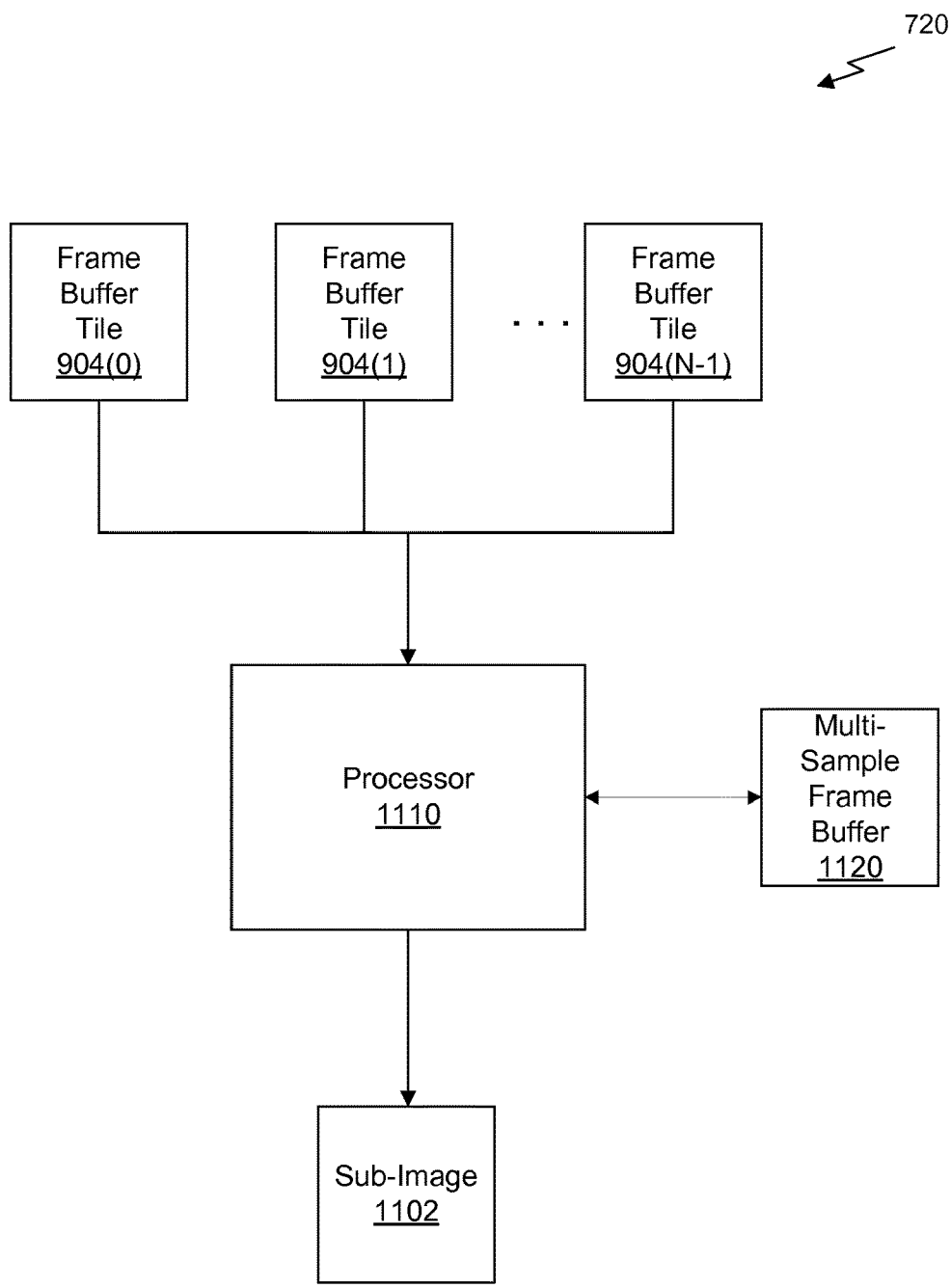
FIG. 11 illustrates a compositing task performed by a compositing node, in accordance with one embodiment.

FIG. 11 illustrates a compositing task performed by a compositing node 720, in accordance with one embodiment. As shown in FIG. 11, the compositing node 720 receives the N frame buffer tiles 904 generated by one or more rendering nodes 710. A processor 1110, such as PPU 200 or SoC 500, decodes each of the frame buffer tiles 904. In one embodiment, the reference frame buffer tile, such as frame buffer tile 904(0), is not compressed and no decoding is necessary. In another embodiment, the reference frame buffer tile may be encoded using an intra-frame encoding technique. In such embodiments, the reference frame buffer tile may be decoded. The values associated with the reference frame buffer tile may be stored in a multi-sample frame buffer 1120 at slots corresponding to a first sample index.

The processor 1110 also decodes each of the additional frame buffer tiles, such as frame buffer tiles 904(1) through 904(N−1), based on the reference frame buffer tile. For example, for each particular frame buffer tile of the additional frame buffer tiles, the processor 1110 may decode the particular frame buffer tile to generate a set of difference values. The difference values may be decoded based on the encoding scheme (such as by unpacking run length encoded values into the original values). The processor 1110 may then calculate one or more values to store in the multi-sample frame buffer 1120 based on the difference values. In one embodiment, each decoded difference value is added to a corresponding value in the reference frame buffer tile to calculate a value corresponding to a sample index for the particular frame buffer tile being decoded. Thus, all of the values in each of the N frame buffer tiles 904 generated by the rendering node(s) 710 may be reconstructed at the compositing node 720 using the reference frame buffer tile values and the decoded difference values for each of the additional frame buffer tiles.

The multi-sample frame buffer 1120 is similar to a single-sample frame buffer except at higher resolution. The multi-sample frame buffer may include N times as many values as pixels in the target image or pixels in a sub-image 1102, which corresponds to a portion of the target image. For example, a multi-sample frame buffer 1120 associated with 16 sample locations per pixel may be arranged in 4×4 blocks of values, each block corresponding to a different pixel of the sub-image 1102 or target image. Each value in a block corresponds to a different sample index for a pixel, which also corresponds to a different frame buffer tile of the N frame buffer tiles 904.

Once the multi-sample frame buffer 1120 has been reconstructed by the compositing node 720, the processor 1110 may generate a sub-image 1102 by filtering the values in the multi-sample frame buffer 1120. For example, the processor 1110 may simply blend each of the values in a block of the multi-sample frame buffer 1120 to generate an average value for the pixel. Alternatively, a value for a pixel may be generated by sampling values from multiple blocks of the multi-sample frame buffer 1120. Various techniques for filtering multi-sample frame buffers 1120 are well-known in the art and may be utilized to generate the sub-image 1102 from the reconstructed multi-sample frame buffer 1120.

Again, the sub-image 1102 may represent the entirety of the target image or may only represent a portion of the target image. In one embodiment, the compositing node 720 may receive additional sub-images from other compositing nodes 720 in order to generate the target image by combining the sub-images into a full target image. Alternatively, the compositing node 720 may transmit the sub-image 1102 to a different compositing node 720 such that the other compositing node 720 may combine the various sub-images to generate the target image. One of the compositing nodes 720 may also cause the target image to be presented on a display device, such as by transmitting the image data of the target image to a display via a display interface.

Figure 12A:
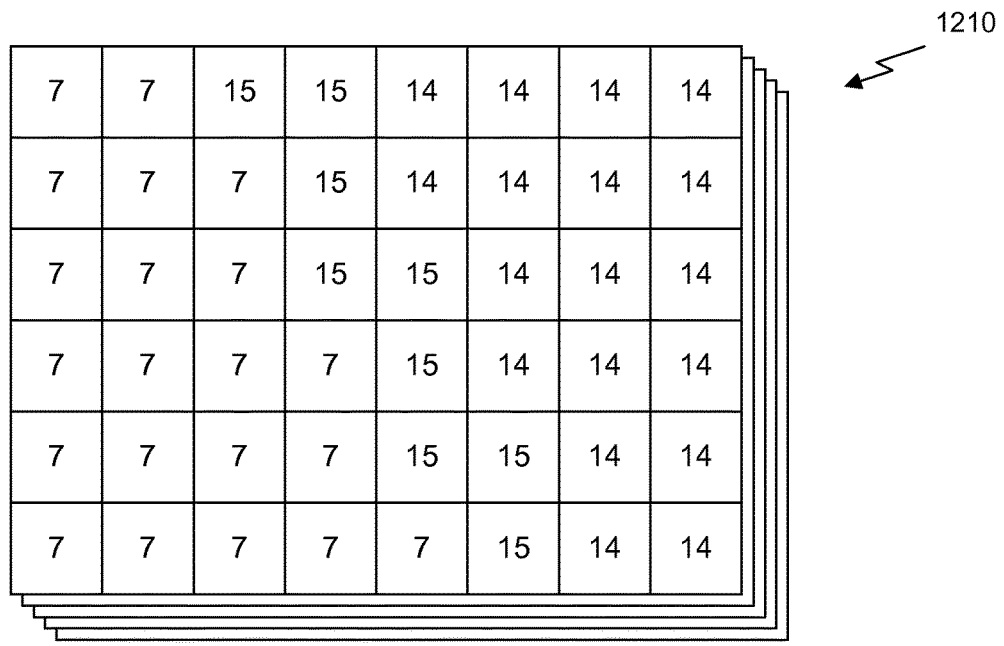
FIG. 12A illustrates a reference frame buffer tile, in accordance with one embodiment.

FIG. 12A illustrates a reference frame buffer tile 1210, in accordance with one embodiment. In one embodiment, the frame buffer tile 1210 includes a color buffer and a depth buffer. The color buffer may store a color value for a pixel and the depth buffer may store a depth value for the pixel. In one embodiment, the color value is stored as a 32-bit value with 8 bits per component. The color value may represent a red component, a green component, a blue component, and an alpha component that indicates a level of transparency of the color. Alternative formats for the color value are within the scope of the present disclosure. For example, the color value may be stored as a 16-bit color value in a 5-6-5 format with 5 bits for each of the red and blue components and 6 bits for the green component. The transparency value may be omitted. In addition, the depth buffer may also store a 32-bit value that indicates a depth associated with the color value. Other formats for the depth value are within the scope of the present disclosure as well, such as a 16-bit depth value.

The frame buffer tile 1210 may represent a first frame buffer tile 904(0) of the N frame buffer tiles 904 generated by a rendering node 710. As such, each value in the frame buffer tile 1210 corresponds to one of the pixels of the target image, and all of the values in the frame buffer tile 1210 correspond to a single sample index (e.g., sample index 0).

Figure 12B:
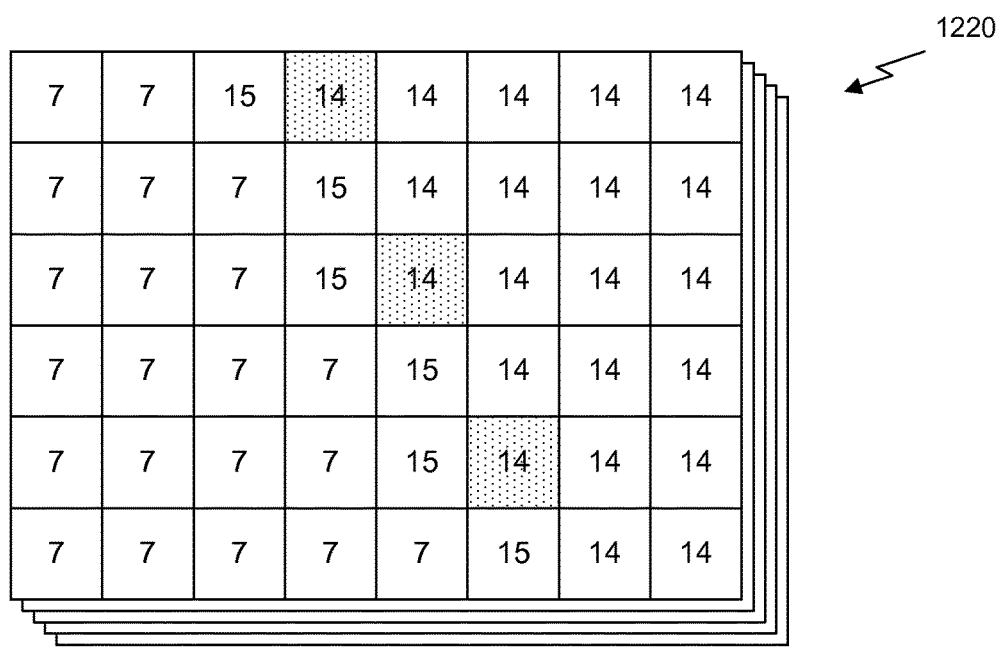
FIG. 12B illustrates a frame buffer tile encoded based on the reference frame buffer tile of FIG. 12A, in accordance with one embodiment.

FIG. 12B illustrates a frame buffer tile 1220 encoded based on the reference frame buffer tile 1210 of FIG. 12A, in accordance with one embodiment. As shown in FIG. 12B, the frame buffer tile 1220 may represent one of the additional frame buffer tiles (e.g., 904(1), 904(2), . . . , and 904(N−1)) of the N frame buffer tiles 904. The values in the frame buffer tile 1220 correspond to the same pixels as the values in the frame buffer tile 1210, but the values correspond to different sample indices (e.g., sample index 1, sample index 2, etc.). The values in the frame buffer tile 1220 are likely to be similar to the values in the frame buffer tile 1210 since many times a primitive will cover many sample locations in a pixel such that the color values associated with those sample locations will be the same or similar.

As shown in FIG. 12B, only three values for a particular color component are different between the pixels in frame buffer tile 1210 and the corresponding pixels in frame buffer tile 1220. The values associated with pixels that are different between the frame buffer tiles are shaded in FIG. 12B. When difference values corresponding to the color component of frame buffer tile 1220 are calculated, all difference values will be zero except for the shaded values, which are one less in frame buffer tile 1220 than the corresponding value for the same pixel but a different sample index in the reference frame buffer tile 1210. Thus, the frame buffer tile 1220 can be compressed efficiently but run length encoding the bit stream representing the calculated difference values between frame buffer tile 1210 and frame buffer tile 1220.

It will be appreciated that the values for each color component may be encoded separately. For example, the difference values may be calculated as 8-bit difference values between the two 8-bit corresponding color components rather than calculating 32-bit difference values between the two 32-bit color values. Each color component of the frame buffer may then be encoded separately. The depth buffer may also be encoded in a similar manner.

Figure 13:
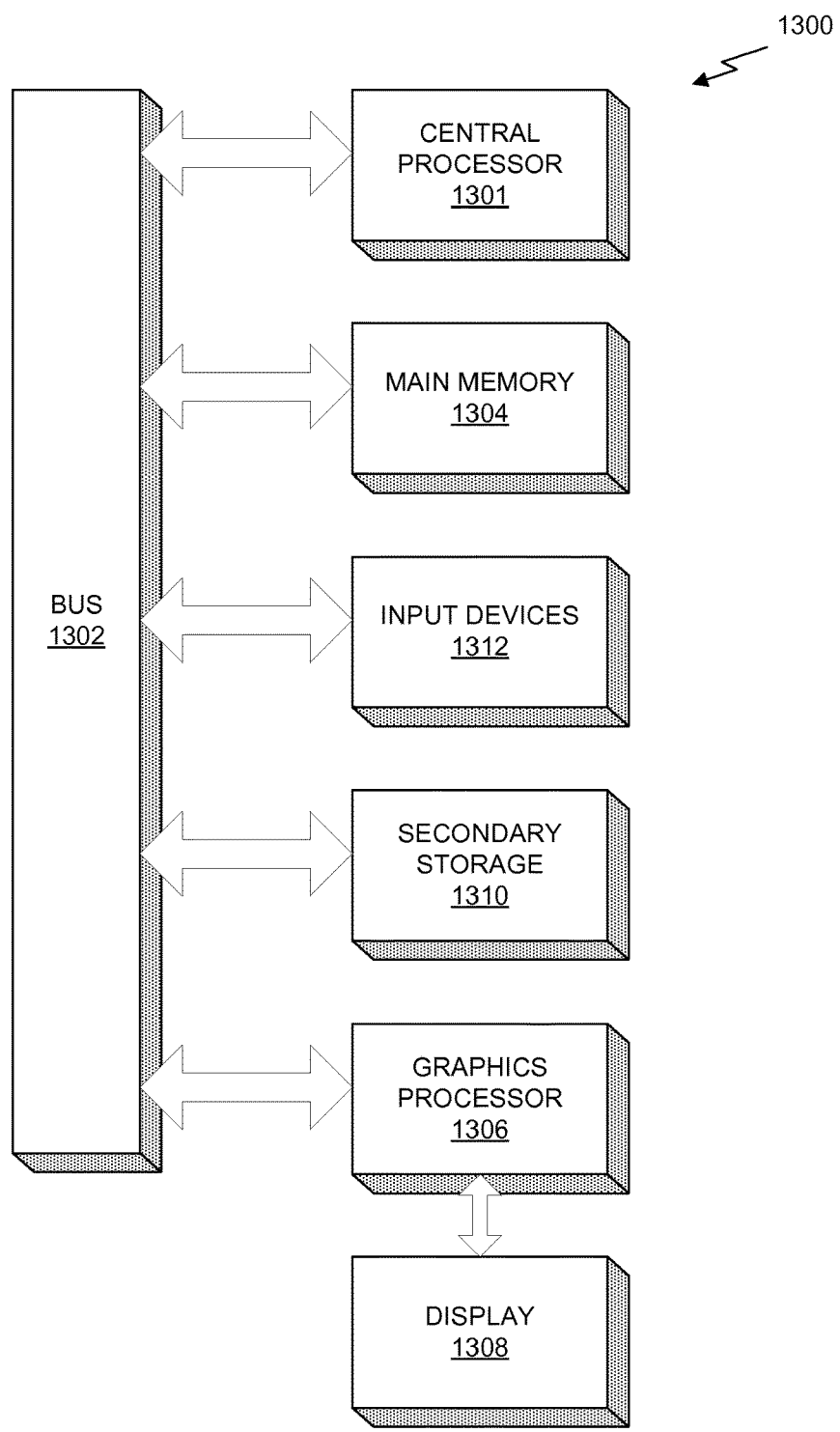
FIG. 13 illustrates an exemplary system in which the various architecture and/or functionality of the various previous embodiments may be implemented.

FIG. 13 illustrates an exemplary system 1300 in which the various architecture and/or functionality of the various previous embodiments may be implemented. As shown, a system 1300 is provided including at least one central processor 1301 that is connected to a communication bus 1302. The communication bus 1302 may be implemented using any suitable protocol, such as PCI (Peripheral Component Interconnect), PCI-Express, AGP (Accelerated Graphics Port), HyperTransport, or any other bus or point-to-point communication protocol(s). The system 1300 also includes a main memory 1304. Control logic (software) and data are stored in the main memory 1304 which may take the form of random access memory (RAM).

The system 1300 also includes input devices 1312, a graphics processor 1306, and a display 1308, i.e. a conventional CRT (cathode ray tube), LCD (liquid crystal display), LED (light emitting diode), plasma display or the like. User input may be received from the input devices 1312, e.g., keyboard, mouse, touchpad, microphone, and the like. In one embodiment, the graphics processor 1306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1300 may also include a secondary storage 1310. The secondary storage 1310 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1304 and/or the secondary storage 1310. Such computer programs, when executed, enable the system 1300 to perform various functions. The memory 1304, the storage 1310, and/or any other storage are possible examples of computer-readable media.

In one embodiment, the architecture and/or functionality of the various previous figures may be implemented in the context of the central processor 1301, the graphics processor 1306, an integrated circuit (not shown) that is capable of at least a portion of the capabilities of both the central processor 1301 and the graphics processor 1306, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1300 may take the form of a desktop computer, laptop computer, server, workstation, game consoles, embedded system, and/or any other type of logic. Still yet, the system 1300 may take the form of various other devices including, but not limited to a personal digital assistant (PDA) device, a mobile phone device, a television, etc.

Further, while not shown, the system 1300 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving graphics data at a plurality of rendering nodes;
rendering at least a portion of the graphics data by one or more rendering nodes of the plurality of rendering nodes to produce multi-sample image data, wherein the multi-sample image data comprises a plurality of values per pixel of an image corresponding to a plurality of sample locations defined for each pixel of the image;
generating a plurality of frame buffer tiles that store the multi-sample image data, wherein a first frame buffer tile stores a first portion of the multi-sample image data produced for a first sample location of the plurality of sample locations defined for a first pixel of the image and a second frame buffer tile stores a second portion of the multi-sample image data that is different than the first portion and is produced for a second sample location of the plurality of sample locations defined for the first pixel;
encoding the plurality of frame buffer tiles using a compression encoding technique; and
transmitting the encoded multi-sample image data to a compositing node.

2. The method of claim 1, wherein encoding the plurality of frame buffer tiles using the compression encoding technique comprises:
identifying a reference frame buffer tile in the plurality of frame buffer tiles;
for each value for the first pixel stored in the first frame buffer tile, calculating a difference value by subtracting a corresponding value for the first pixel in the reference frame buffer tile from the value for the pixel in the first frame buffer tile; and
encoding a plurality of difference values using run length encoding.

3. The method of claim 2, wherein the reference frame buffer tile is generated by a first rendering node of the one or more rendering nodes and is transferred from the first rendering node to other rendering nodes of the one or more rendering nodes.

4. The method of claim 1, wherein each rendering node in the one or more rendering nodes is configured to generate one frame buffer tile corresponding to a single sample location.

5. The method of claim 1, wherein a first rendering node in the one or more rendering nodes generates the first frame buffer tile and transmits the first frame buffer tile to one or more additional rendering nodes in the one or more rendering nodes generate additional frame buffer tiles, each frame buffer tile in the additional frame buffer tiles corresponding to a different sample location.

6. The method of claim 1, wherein the plurality of frame buffer tiles is encoded using a hardware video encoder.

7. The method of claim 2, wherein the reference frame is encoded as an intra-encoded frame and the additional frames are encoded as predictive frames.

8. The method of claim 1, wherein the graphics data comprises one of a point cloud, a set of voxels, and a polygonal mesh.

9. The method of claim 8, wherein a plurality of graphics primitives are extracted from the graphics data, and wherein rendering the graphics data comprises processing the plurality of graphics primitives via a graphics processing pipeline implemented by a parallel processing unit.

10. The method of claim 1, wherein, in a particular rendering node of the one or more rendering nodes, a plurality of frame buffers tiles for storing the multi-sample image data are allocated in a memory, the particular rendering node generating the multi-sample image data in parallel by:
    allocating a plurality of threads in a parallel processing unit, wherein each thread corresponds to a different sample location of the plurality of sample locations;
    processing a graphics primitive represented by the graphics data by the plurality of threads,
    wherein the processing by each thread, for each pixel in screen space covered by the graphics primitive, comprises:
        generating a color value for the graphics primitive at a sample location within the pixel specified for the thread; and
        storing the color value in a particular frame buffer tile associated with the sample location for the thread.

11. The method of claim 10, wherein the processing by each thread, for each pixel in screen space covered by the graphics primitive, further comprises:
    generating a depth value for the graphics primitive at the sample location within the pixel specified for the thread; and
    storing the depth value in the particular frame buffer tile associated with the sample location for the thread.

12. The method of claim 1, wherein the compositing node is configured to:
    decode the plurality of frame buffer tiles to reconstruct a multi-sample frame buffer; and
    generate the image by filtering the multi-sample frame buffer.

13. The method of claim 12, wherein the multi-sample frame buffer is reconstructed by decoding the plurality of encoded frame buffer tiles received from one or more rendering nodes based on a reference frame buffer tile.

14. The method of claim 1, wherein the compositing node is configured to:
    decode the plurality of frame buffer tiles to reconstruct a multi-sample frame buffer;
    generate a first sub-image by filtering the multi-sample frame buffer;
    transmit the first sub-image to a second compositing node that is configured to generate the image by combining the first sub-image with one or more additional sub-images from one or more additional compositing nodes.

15. The method of claim 1, wherein the frame buffer tiles are rendered for each sample location of a pixel in sequence and the encoding comprises:
    identifying the first frame buffer tile as a reference frame buffer tile; and
    as each frame buffer tile is rendered, encoding the frame buffer tile based on the reference frame buffer tile.

16. A non-transitory computer-readable storage medium storing instructions that, when executed by a processor, cause the processor to perform steps comprising:
    receiving graphics data at a plurality of rendering nodes;
    rendering at least a portion of the graphics data by one or more rendering nodes of the plurality of rendering nodes to produce multi-sample image data, wherein the multi-sample image data comprises a plurality of values per pixel of an image corresponding to a plurality of sample locations defined for each pixel of the image;
    generating a plurality of frame buffer tiles that store the multi-sample image data, wherein a first frame buffer tile stores a first portion of the multi-sample image data produced for a first sample location of the plurality of sample locations defined for a first pixel of the image and a second frame buffer tile stores a second portion of the multi-sample image data that is different than the first portion and is produced for a second sample location of the plurality of sample locations defined for the first pixel;
    encoding the plurality of frame buffer tiles using a compression encoding technique; and
    transmitting the encoded multi-sample image data to a compositing node.

17. A system, comprising:
a compositing node; and
a plurality of rendering nodes for rendering graphics data, where each rendering node in the plurality of rendering nodes is communicatively coupled to the compositing node and configured to:
    receive a portion of the graphics data,
    render the portion of the graphics data to produce multi-sample image data, wherein the multi-sample image data comprises a plurality of values per pixel of an image corresponding to a plurality of sample locations defined for each pixel of the image,
    generate a plurality of frame buffer tiles that store the multi-sample image data, wherein a first frame buffer tile stores a first portion of the multi-sample image data produced for a first sample location of the plurality of sample locations defined for a first pixel of the image and a second frame buffer tile stores a second portion of the multi-sample image data that is different than the first portion and is produced for a second sample location of the plurality of sample locations defined for the first pixel,
    encode the plurality of frame buffer tiles using a compression encoding technique, and
    transmit the encoded multi-sample image data to the compositing node.

18. The system of claim 17, wherein the compositing node is configured to:
    decode the plurality of frame buffer tiles to reconstruct a multi-sample frame buffer; and
    generate the image by filtering the multi-sample frame buffer.

* * * * *